United States Patent
Dolan

(10) Patent No.: US 9,863,458 B2
(45) Date of Patent: Jan. 9, 2018

(54) APPARATUS FOR TIGHTENING THREADED FASTENERS

(71) Applicant: JETYD Corporation, South Hackensack, NJ (US)

(72) Inventor: Michael F. Dolan, Kenilworth, NJ (US)

(73) Assignee: HYTORC Division UNEX Corporation, Mahwah, NJ (US)

( * ) Notice: Subject to any disclaimer, the term of this patent is extended or adjusted under 35 U.S.C. 154(b) by 0 days.

(21) Appl. No.: 14/915,234

(22) PCT Filed: Aug. 27, 2014

(86) PCT No.: PCT/US2014/053026
§ 371 (c)(1),
(2) Date: Feb. 27, 2016

(87) PCT Pub. No.: WO2015/031545
PCT Pub. Date: Mar. 5, 2015

(65) Prior Publication Data
US 2016/0201713 A1    Jul. 14, 2016

Related U.S. Application Data

(60) Provisional application No. 61/870,295, filed on Aug. 27, 2013.

(51) Int. Cl.
| | | |
|---|---|---|
| F16B 37/08 | (2006.01) |
| F16B 39/12 | (2006.01) |
| B25B 21/00 | (2006.01) |
| F16B 39/10 | (2006.01) |
| F16B 39/16 | (2006.01) |
| F16B 31/04 | (2006.01) |
| F16B 39/18 | (2006.01) |
| F16B 33/02 | (2006.01) |

(52) U.S. Cl.
CPC .............. *F16B 39/12* (2013.01); *B25B 21/00* (2013.01); *F16B 39/108* (2013.01); *F16B 39/16* (2013.01); *F16B 31/04* (2013.01); *F16B 39/18* (2013.01); *F16B 2033/025* (2013.01)

(58) Field of Classification Search
CPC .......... F16B 31/04; F16B 37/08; F16B 39/12; F16B 39/16; F16B 39/18; F16B 39/108
USPC .......................................... 411/383, 429, 432
See application file for complete search history.

(56) References Cited

U.S. PATENT DOCUMENTS

| | | | | |
|---|---|---|---|---|
| 916,298 A | * | 3/1909 | Gifford | F16B 39/12 411/222 |
| 1,613,493 A | * | 1/1927 | Turner | F16B 39/10 411/225 |

(Continued)

*Primary Examiner* — Roberta Delisle
(74) *Attorney, Agent, or Firm* — Justin B. Bender, Esq.

(57) ABSTRACT

According to a first aspect of the invention we provide a three-piece self-reacting fastener, or lock nut, for connecting a joint having a threaded connector including: a first nut member engageable with the threaded connector and axially displaceable; a second nut member engageable with the first nut member and rotatable about an axis; a third nut member non-rotatably but axially displaceably connected with the first nut member, which during rotation about the axis, applies a load to the threaded connector and to tighten the lock nut; and a locking means which substantially non-rotatably connects the second nut member and the threaded connector with one another after tightening the lock nut.

4 Claims, 1 Drawing Sheet

(56) References Cited

U.S. PATENT DOCUMENTS

| | | | | |
|---|---|---|---|---|
| 5,152,649 A * | 10/1992 | Popp | ................ | B25B 31/00 29/256 |
| 5,391,033 A * | 2/1995 | Gibbons | ................ | F16B 39/18 411/263 |
| 5,622,465 A * | 4/1997 | Junkers | ................ | F16B 31/04 411/223 |
| 5,709,514 A * | 1/1998 | Suggs | ................ | F16B 31/04 411/150 |
| 5,961,266 A * | 10/1999 | Tseng | ................ | F16B 37/12 411/289 |
| 6,179,512 B1 * | 1/2001 | Gibson | ................ | B23B 31/201 279/140 |
| 6,695,557 B2 * | 2/2004 | Hove | ................ | F16B 37/14 292/307 B |
| 2003/0185651 A1 * | 10/2003 | Lees | ................ | F16B 39/16 411/432 |
| 2010/0158635 A1 * | 6/2010 | Rodman | ................ | F16B 37/0864 411/432 |

* cited by examiner

APPARATUS FOR TIGHTENING THREADED FASTENERS

CROSS REFERENCE TO RELATED APPLICATION

This Application is a continuation application of and claims priority to U.S. Application Ser. No. 61/870,295, having the Filing Date of 27 Aug. 2013, entitled "ANTI-LOOSENING COVER FOR SELF-REACTING FASTENERS", an entire copy of which is incorporated herein by reference.

DESCRIPTION OF INVENTION

Lock nuts are known in the art and widely utilized in industry. Some lock nuts require a firm connection of the nut with the bolt. Other lock nuts require a firm connection with the flange within which the bolt is screwed. Also, lock nuts that are provided with a two-piece washer slidable in one direction relative to one another and provided with rippled surfaces to abut against the flange surface on one side and against the nut bearing surface on the other side. Also, a lock nut is known which is designed so as to eliminate rotation of one of the nut members after tightening of the lock nut as disclosed in Applicant's affiliate's U.S. Pat. Nos. 5,622,465 and 5,888,041, entire copies of which are incorporated herein by reference. These lock nuts or three-piece self-reacting fasteners, generally, and means for locking and or mechanically affixing load carrying threaded components of such three-piece self-reacting fasteners to prevent load loss from unintentional unthreading can be further improved.

Accordingly, it is an object of present invention to provide a lock nut which is a further improvement of existing lock nuts.

In keeping with these objects and with others which will become apparent hereinafter, one feature of the present invention resides, briefly stated, in a three-piece self-reacting fastener, or lock nut for connecting a joint having a threaded connector including: a first nut member engageable with the threaded connector and axially displaceable; a second nut member engageable with the first nut member and rotatable about an axis; a third nut member non-rotatably but axially displaceably connected with the first nut member, which during rotation about the axis, applies a load to the threaded connector and to tighten the lock nut; and a locking means which substantially non-rotatably connects the second nut member and the threaded connector with one another after tightening the lock nut. The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

The present invention may be described, by way of example only, with reference to the accompanying drawings, of which:

Figures 1, 2, 3:
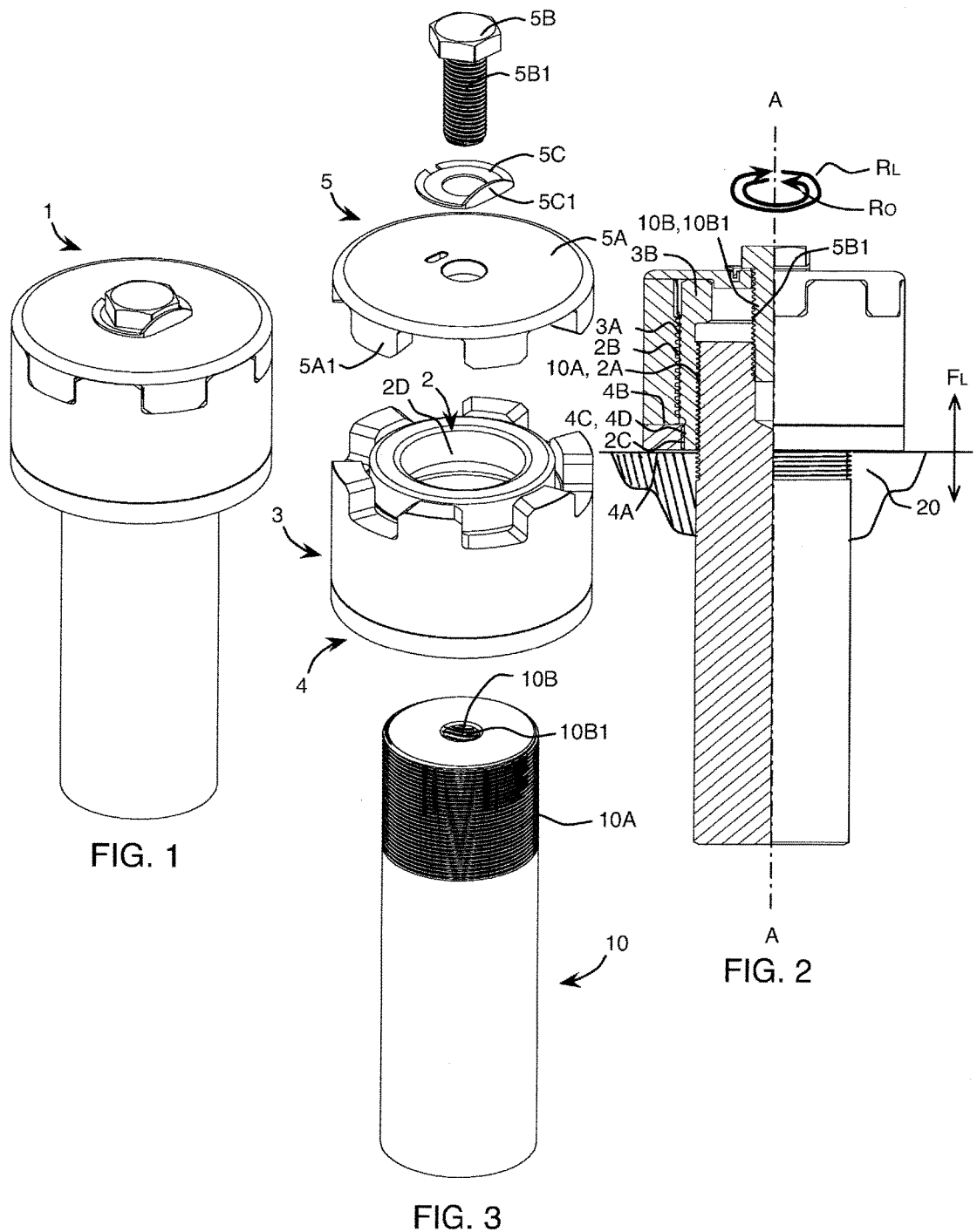
FIG. 1 is a perspective view of the lock nut of the present invention for connecting the joint having the threaded connector.
FIG. 2 is a cross-section view showing internal parts of the lock nut of the present invention.
FIG. 3 is an exploded perspective view of the lock nut of the present invention.

Referring to FIGS. 1-3, a lock nut 1 in accordance with the present invention for connecting a joint 20 having a threaded connector, or stud, 10 including: a first nut member, or inner sleeve, 2 engageable with threaded connector 10 and axially displaceable; a second nut member, or outer sleeve, 3 engageable with first nut member 2 and rotatable about an axis A; a third nut member, or washer 4 non-rotatably but axially displaceably connected with first nut member 2, which during rotation $R_L$ about axis A, applies a load $F_L$ to threaded connector 10 to tighten lock nut 1; and a locking means 100 which substantially non-rotatably connects second nut member 3 and threaded connector 10 with one another after tightening lock nut 1.

First nut member, or inner sleeve, 2 has inner thread means 2A engageable with outer thread means 10A of threaded connector 10 of joint 20. Inner sleeve 2 also has outer thread means 2B. Furthermore, it is provided with a polygonal formation 2C which is engageable with a polygonal formation 4C of third nut member, or washer 4, so that washer 4 and inner sleeve 2 are connected with one another non-rotatably by displacement in an axial direction relative to one another. Polygonal formation 2C can be formed by a plurality of splines which extend in an axial direction and are spaced from one another in a circumferential direction. Inner sleeve 2 may have another polygonal formation provided in the upper part on its inner surface, which is not shown in FIGS. 1-3. This polygonal formation also can be formed by a plurality of splines which extend in an axial direction and are spaced from one another in a circumferential direction.

Second nut member, or outer sleeve, 3 has inner thread means 3A which is engageable with outer thread means 2B of inner sleeve 2. It further has an additional polygonal formation 3B which can be formed by a plurality of castellations extending in an axial direction and spaced from one another in a circumferential direction.

Third nut member, or washer, 4 is ring-shaped and has a lower surface 4A which is substantially rough and an upper surface 4B which is substantially smooth. Surfaces 4A and 4B are spaced from one another in an axial A direction. Washer 4 further has an inner surface 4C which has a polygonal formation 4D formed for example by a plurality of inner splines. The splines extend in an axial direction and are spaced from one another in a circumferential direction. Rough surface 4A can be made in many different ways, for example by a plurality of ripples or serrations.

Threaded connector 10 is formed as a stud, but may be any suitable structure such as a bolt. It includes outer thread means 10A formed on an upper portion engageable with inner thread means 2A of inner sleeve 2. A centerline tapped hole 10B is formed in the upper portion of threaded connector 10 having a locking thread formation 10B1. Locking thread formation 10B, as shown, is formed as internal left-handed threads. As shown in FIGS. 1-3, tabbed washer 5C rotationally couples bolt 5B with cover 5A through protruding interfering tabs 5C1. Washer 5C rotationally couples with bolt 5B through a mechanical deformation process after bolt 5B has been tightened. Bolt 5B attaches to tapped hole 10B via locking thread formation 5B1 formed as helical threads. Note that tapped hole 10B formed in the upper portion serves the additional purpose of allowing for easy pick-up, holding and transfer of threaded connector 10.

Lock nut 1 further has a locking means 5 including a first locking member, or cover, 5A and a second locking member, or bolt, 5B. Locking means 5 also includes a third locking member, or tabbed washer, 5C, but alternatively does not. Cover 5A is formed as a cap having a polygonal locking formation, or castellations, 5A1 non-rotatably engageable with polygonal nut formation, or castellations, 3B. Bolt 5B is formed as a threaded hexagonal bolt having a locking thread formation 5B1 threadedly engageable with locking thread formation 10B1 of threaded connector 10. Locking thread formation 5B1, as shown, is formed as external left-handed threads.

Locking thread formation 5B1 of threaded bolt 5B has opposing thread with respect to outer thread means 10A of threaded connector 10 and outer thread means 2B of inner sleeve 2, e.g. the load generating thread. Opposing the thread direction has a positive and immediate locking effect. Any relative travel as a result of rotation in direction $R_L$ would be in the opposite direction $R_O$ causing rotational locking. This substantially prevents rotation between second nut member, or inner sleeve, 2 and threaded connector 10.

Locking cover 5A must be rotationally coupled with the load generating member of lock nut 1, typically outer sleeve 3. In all instances outer sleeve 3 must have rotational coupling features, such as splines or castellations, allowing torque to be applied by a torque input device, or torque power tool (not shown), for loading, in rotational direction $R_L$. Cover 5A must also have a feature or features allowing connection to threaded connector 10 through a threaded fastener such as a screw or bolt 5B. Cover 5A is rotationally coupled with left-hand threaded bolt 5B by means of third locking member, or tabbed washer, 5C. Tabbed washer 5C couples these two components by interference of fixed and bent tabbing 5C1.

By rotationally coupling cover 5A to outer sleeve 3 of three-piece self-reacting fastener, or lock nut, 1 is locked to threaded connector 10 and will retain its load until relative rotation among locked elements occurs. Cover 5A is rotationally connected to outer sleeve 3 through interference. Cover 5A is also rotationally coupled to bolt 5B, its retention device. If opposing (right-handed vs. left-handed) threads, relative to lock nut 1, are used, as shown in FIGS. 1-3, any rotational loosening movement will be substantially prevented. This is the result of the diverging translation tendency of locking means 5 with respect to outer sleeve 3. Inner sleeve 2 of lock nut 1 is thus substantially prevented from relative loosening motions as its translation capacity is limited by locking means 5.

Lock nut 1 in accordance with the present invention operates as follows. Lock nut 1 including first nut member 2, second nut member 3 and third nut member 4 is applied onto threaded connector 10. In particular first nut member 2 is screwed on outer thread means 10A formed on the upper portion. Then, castellations 3B of second nut member 3 are engaged by a tool and second nut member 3 is turned around axis A. First nut member 2 may be prevented from rotation by being held with a tool engaging in a splined portion at 2D, not shown. During turning of second nut member 3, it slides with its lower surface against smooth surface 4B of third nut member 4, first nut member 2 is displaced axially upwardly and tightens threaded connector 10. Lower rough surface 4A of third nut member 4 embeds in the upper surface of joint 20, such as a flange face, and third nut member 4 together with first nut member 2 do not turn during this process. When lock nut 1 is sufficiently tightened, the tool is disengaged and locking means 5 is fitted over the nut members, so that the castellations 5A1 of locking cap 5A engage with castellations 3B of second nut member 3. Bolt 5B is threaded into blind hole 10B and tightened. As a result, all parts of lock nut 1 become non-rotatably connected with one another and lock nut 1 can not turn relative to joint 20, threaded connector 10 or itself.

Alternative structures may be used to substantially prevent rotational loosening movement. For example, lock nut 1 may be rotationally coupled to cover 5A through mechanical interference, such as from stamping, staking or a metal deformation process, thereby eliminating the need for tabbed washer 5C. Additionally threaded attachment could be created with a plurality of threaded fastening elements, similar to bolt 5B, inserted through a plurality of holes in cover 5a into a plurality of tapped holes in the upper portion of threaded connector 10. Multiple fastening elements ensures rotational coupling of cover 5A with the stud without the need for opposing threads. Alternatively cover 5B could be fastened through a center line threaded hole, wherein the hole and cover fastening element have locking thread formations with a thread pitch or size different from that of the lock nut and the threaded connector. Varying thread pitch or size would prevent loosening from relative rotation of the entire assembly or the load carrying outer sleeve as a result of translation conflict from each element.

Generally the present application discloses and protects the novel mechanism used to mechanically fix an anti-rotation cover means to a three-piece self-reacting fastener with opposing threads. If the three-piece self-reacting fastener starts to vibrate free because of rotation, the anti-rotation cover and bolt with opposite left-handed threads will get tighter to prevent further movement. If the nut loosens the retention bolt gets tighter by holding everything together.

It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

While the invention has been illustrated and described as embodied in a three-piece self-reacting fastener for use with a fluid operated tool, it is not intended to be limited to the details shown, since various modifications and structural changes may be made without departing in any way from the spirit of the present invention.

When used in this specification and claims, the terms "comprising", "including", "having" and variations thereof mean that the specified features, steps or integers are included. The terms are not to be interpreted to exclude the presence of other features, steps or components.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is:

1. A three-piece self-reacting fastener including:
   a first nut member engageable with a threaded connector and axially displaceable, the threaded connector having a first locking thread formation;
   a second nut member engageable with the first nut member and rotatable about an axis, the second nut member having a polygonal nut formation;
   a third nut member non-rotatably but axially displaceably connected with the first nut member, which during rotation about the axis, applies a load to the threaded connector to tighten the fastener including a locking means which after its tightening, substantially non-rotatably connects the second nut member and the threaded connector with one another; the locking means having a first locking member with a polygonal locking formation non-rotatably engageable with the polygonal nut formation; and a second locking member with a second locking thread formation engageable with the first locking thread formation, so as to substantially prevent rotation between the second nut member and the threaded connector.

2. The fastener according to claim 1 including:

the polygonal nut formation and the polygonal locking formation formed of either a plurality of splines or a plurality of castellations; and the first locking thread formation and the second locking thread formation formed of either a thread pitch, a thread direction, or both a thread pitch and a thread direction, different from that of the first nut member and the threaded connector.

3. The fastener according to claim 1 or 2 wherein the three-piece self-reacting fastener is locked to the threaded connector and will retain its load by rotationally coupling the first locking member to the second nut member.

4. An industrial bolting apparatus including a torque power tool either electrically, hydraulically, manually or pneumatically driven which tightens a three piece self-reacting fastener of either claim 1, 2 or 3.

* * * * *